US011070467B1

(12) United States Patent
Shukla

(10) Patent No.: US 11,070,467 B1
(45) Date of Patent: Jul. 20, 2021

(54) EXPEDITED ROUTE RECOVERY AND LOAD BALANCING IN A MULTI-RADIO MESH NETWORK

(71) Applicant: Amazon Technologies, Inc., Seattle, WA (US)

(72) Inventor: Ashish Kumar Shukla, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 229 days.

(21) Appl. No.: 16/422,768

(22) Filed: May 24, 2019

(51) Int. Cl.
*H04L 12/703* (2013.01)
*H04W 84/12* (2009.01)
*H04W 84/18* (2009.01)
*H04W 72/04* (2009.01)
*H04W 8/00* (2009.01)

(52) U.S. Cl.
CPC ............ *H04L 45/28* (2013.01); *H04W 8/005* (2013.01); *H04W 72/0446* (2013.01); *H04W 84/12* (2013.01); *H04W 84/18* (2013.01)

(58) Field of Classification Search
CPC . H04W 8/005; H04W 72/0446; H04W 84/12; H04W 84/18; H04L 45/28
USPC ........................................................ 370/216
See application file for complete search history.

(56) References Cited

PUBLICATIONS

IEEE Std 802.11—2016 IEEE Standard for Information Technology—Local and Metropolitan Area Networks—Specific Requirements Part 11: Wireless LAN MAC and PHY Specifications, MLME Mesh Procedures, Section 14 (Nov. 2016).
IEEE Std 802.11—2016 IEEE Standard for Information Technology—Local and Metropolitan Area Networks—Specific Requirements Part 11: Wireless LAN MAC and PHY Specifications, Sections 9.4.2.115 PERR element and 14.10.11 Path error (PERR) mechanism (Nov. 2016).

*Primary Examiner* — Gbemileke J Onamuti
(74) *Attorney, Agent, or Firm* — Lowenstein Sandler LLP

(57) ABSTRACT

Network hardware devices organized in a wireless mesh network (WMN). A first mesh network device includes processing logic that detects an error condition of a first wireless link to a next hop node in a wireless path between a second mesh network device and a third mesh network device. The processing logic sends, via a first radio of the first mesh network device, a first frame with a first path error message over a second wireless link to a precursor hop node in the wireless path. The first path error message identifies the error condition of the first wireless link. The processing logic generates a second frame with a copy of the first path error message and sends, via a secondary radio of the first mesh network device, the second frame with the copy of the first path error message.

20 Claims, 9 Drawing Sheets

EXPEDITED ROUTE RECOVERY AND LOAD BALANCING IN A MULTI-RADIO MESH NETWORK

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
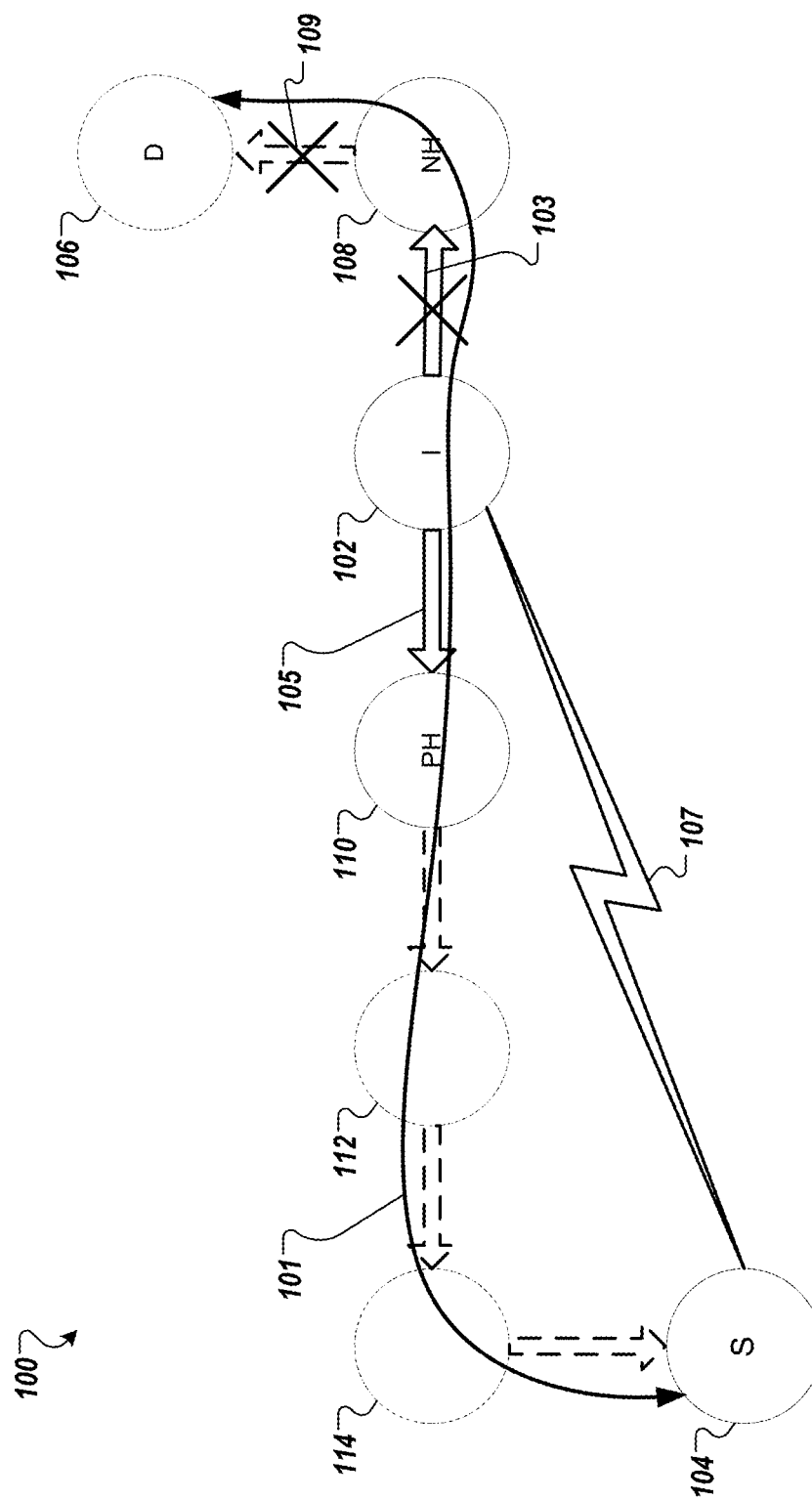
FIG. 1 is a network diagram with an intermediate mesh network device in a wireless path between a source mesh network device and a destination mesh network device 106 in a wireless mesh network according to one embodiment.

Technologies directed to expedited route recovery and load balancing in a multi-radio mesh network. A multi-radio mesh network (also referred to as a multi-hop mesh network) utilizes multiple mesh nodes, where each mesh node has more than one radio, to establish end-to-end route between any two pair of source and destination mesh nodes (also referred to as stations (STAs)). The route recovery, upon detecting link failure, is very costly operation in the multi-hop mesh network, especially if a network diameter is large. The network diameter can be characterized in terms of a maximum number of hops to reach any destination in the mesh network from any given source mesh node. It takes time to propagate standard path error messages (also referred to as path error (PERR) elements) from the node detecting the wireless link failure to the source of the route. Also, due to the radios operating on the different independent channels, by the time the source node receives path error elements, the traffic queues build-up on all the intermediate nodes between the source and the node experiencing failure. In general, the frames that were originated from the source node and are currently sitting on the queues on the intermediate nodes serve no purpose, as these intermediate nodes do nothing with these frames, until the next hop would drain these eventually, or eventually expired in the queue upon overflow. Also, these frames create congestion on the network where intermediate nodes buffer the frames but the frames in the queue are not drained due to the link failure. In the worst case, these queues cannot serve any traffic for otherwise good routes, sharing the same set of nodes, due to queues overflow. The more time it takes for an error message to reach the source, the more nodes start getting affected. Generally, recovery from this congestion is not quick as flows, like Transmit Control Protocol (TCP), slow down drastically, in addition to the increased latency.

Aspects of the present disclosure address the above and other deficiencies by providing an additional low-power, long-range radio into one or more mesh network device of a mesh network device. The additional low-power, low-range radio can be considered a secondary radio for expedited route recovery and load balancing in the multi-radio mesh network. The secondary radio can be an event-driven radio that can be enabled to transmit data only upon detection of an event. The event-driven radio can be a low-power, long-range wide area network (LPWAN) radio, for example, a wireless radio that uses the LoRa (Long Range) technology. In other embodiments, the secondary radio can be a narrowband Internet of Things (IoT) radio, a LTE Cat M1 radio, or the like. Alternatively, the secondary radio can be a sub-gigahertz radio (e.g., Sub-1 gigahertz (GHz) radio). In some cases, the secondary radio can operate at a frequency higher than 1 GHz, such as 2.4 GHz using Bluetooth Low Energy (BLE). The one or more primary radios can be WLAN radios, such as in the 2.4 GHz or 5 GHz frequency bands. For example, an intermediate mesh network device in a wireless path detects a link failure in one of its wireless mesh links to one of its neighbor nodes. In other cases, the intermediate node can receive a PERR element from another mesh network device, such as one that doesn't have a secondary radio, and the intermediate node can forward the PERR element on the wireless path, as well as transmit a copy of the PERR element using the secondary radio.

In some cases, the secondary radio can reach a much larger distance than the primary radio. For example, the LoRa radio or the sub-gigahertz radio can reach miles of distance. The capability of the radio in terms of achievable range, should depend on the maximum number of wireless hops mesh network is expected to operate. For example, considering 100 meter (m) wireless range, a 10-hop network can span 1 kilometer (km). The secondary radio can achieve the 1 km span of the 10-hop network. In some embodiments, a module application programming interface (API) can be used by a multi-radio mesh routing module to propagate signals on the wireless mesh network.

In one embodiment, a mesh network device has one or more mesh radios and a LPWAN radio. When the mesh network device detects a link failure of a first mesh link in a wireless mesh path, the mesh network device can send a PERR element to a source mesh network device over a second mesh network device with a precursor hop in the wireless path. The PERR element identifies the link failure of the first mesh link. The mesh network device also sends a copy of the PERR element using the LPWAN radio to the source mesh network device. For example, the mesh network device can encapsulate the PERR element into a payload of a frame and sends the frame using the LPWAN to the source mesh network device.

FIG. 1 is a network diagram with an intermediate mesh network device 102 in a wireless path 101 between a source mesh network device 104 and a destination mesh network device 106 in a wireless mesh network 100 according to one embodiment. The wireless path 101 includes multiple intervening mesh network devices between the source mesh network device 104 and the destination mesh network device 106. The intermediate mesh network device 102 detects an error condition of a first wireless link 103 to a next hop node 108 in the wireless path 101. The next hop node 108 can be a destination mesh network device or another intermediate node in the wireless path 101 to the destination mesh network device 106. When the error condition of the first wireless link 103 is detected, the intermediate mesh network device 102 sends, via a first radio, a first frame with a first path message over a second wireless link 105 to a precursor hop node 110 in the wireless path 101. The first path error message identifies the error condition of the first wireless link 103. The first wireless link 103 and the second wireless link 105 are part of the wireless path 101 between the source mesh network device 104 (i.e. the second mesh network device) and the destination mesh network device 106 (i.e., the third mesh network device). The precursor hop node 110 can be a source mesh network device or another intermediate node in the wireless path 101 to the source mesh network device 104. As illustrated in FIG. 1, the wireless path 101 includes two intermediate nodes 112, 114, between the precursor hop node 110 and the source mesh network device 104. Alternatively, the wireless path 101 can include more or less intermediate nodes between the source mesh network device 104 and the destination mesh network device 106. The intermediate mesh network device 102 generates a second frame with a copy of the first path error message and sends, via a secondary radio over a wireless link 107, the second frame with the copy of the first path error message. The second frame can be transmitted directly to the source mesh network device 104. Alternatively, the second frame can be received by another intermediate mesh network device and retransmitted to the source mesh network device 104.

In one embodiment, the intermediate mesh network device 102 can transmit the second frame as a unicast frame. The unicast frame identifies the source mesh network device 104. The intermediate mesh network device 102 sends, via the secondary radio, the unicast frame to the source mesh network device 104. In another embodiment, the intermediate mesh network device 102 can transmit the second frame as a broadcast frame. The intermediate mesh network device 102 can transmit the broadcast to all mesh network devices in the wireless mesh network 100. In another embodiment, the intermediate mesh network device 102 can transmit the second frame as a multi-cast frame. The intermediate mesh network device 102 can transmit the multi-cast frame to a subset of all mesh network devices in the wireless mesh network 100.

In some cases, the intermediate mesh network device 102 can detect a link failure of another mesh link 109 in the wireless mesh network 100. For example, the intermediate mesh network device 102 can receive a path error message from the next hop node 108, the path error message identifying the link failure of the mesh link 109. The next hop node 108 may not have a secondary radio and does not transmit the path error message on a secondary radio. The intermediate mesh network device 102 can generate a frame with the path error message regarding the link failure of the mesh link 109 and send the frame to the source mesh network device 104 via the wireless link 107.

Figure 2:
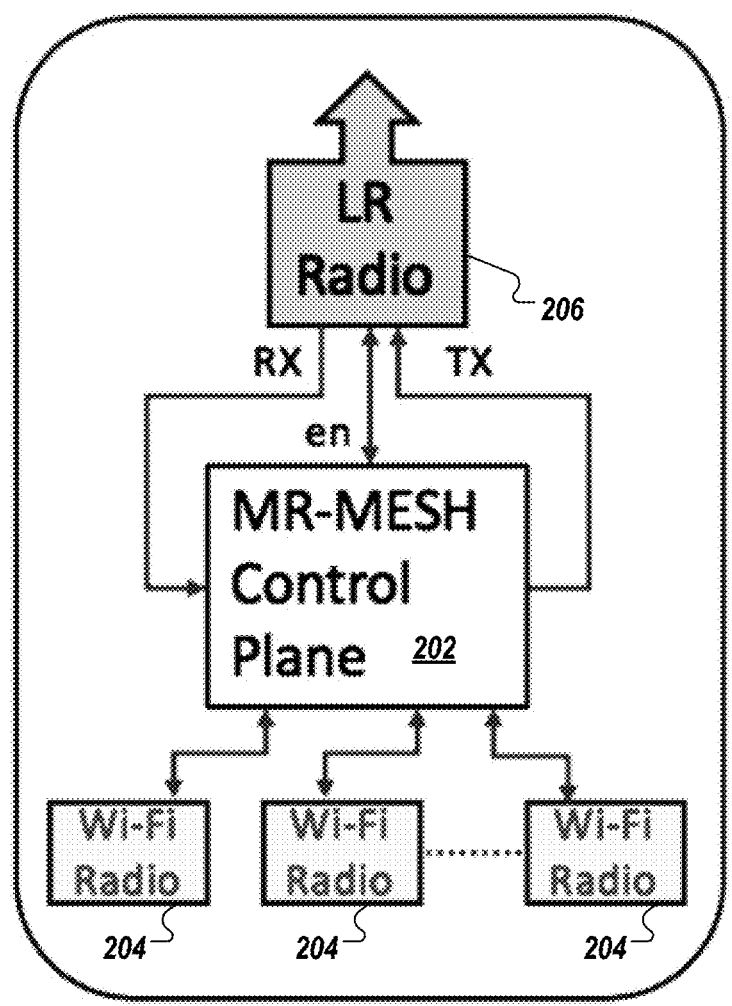
FIG. 2 is a block diagram of a multi-radio mesh network device with multi-radio mesh control logic to control multiple wireless local area network (WLAN) radios and a secondary long-range (LR) radio for expedited router recovery and load balancing according to one embodiment.

FIG. 2 is a block diagram of a multi-radio mesh network device 200 with multi-radio mesh control logic 202 to control multiple WLAN radios 204 and a secondary LR radio 206 for expedited router recovery and load balancing according to one embodiment. The multi-radio mesh control logic 202 can be processing logic that comprises hardware (e.g., circuitry, dedicated logic, programmable logic, microcode, etc.), software, firmware, or a combination thereof. In one embodiment, the multi-radio mesh control logic 202 is implemented in a MAC layer, a data link layer, or an application layer. In another embodiment, the multi-radio mesh control logic 202 is implemented in an application processor that is coupled to the secondary LR radio 206 and the WLAN radios 204. Alternatively, the multi-radio mesh control logic 202 can be implemented in a processing device. The multi-radio mesh control logic 202 can receive data from each of the WLAN radios 204. The data may include status information, error condition data, or other information regarding the operation of the radios. As described herein, the multi-radio mesh control logic 202 can detect an error condition, such as a link failure, a power loss event, a channel busy condition, an isolated node condition, an absent route condition, or the like. In some cases, one of the WLAN radios 204 can receive a path error message from another mesh network device, where the path error message identifies any of these conditions.

The multi-radio mesh control logic 202 can detect a link failure of a first mesh link in a wireless mesh path between a source mesh network device and a destination mesh network device. The multi-radio mesh control logic 202 sends, via the WLAN radio 204, a first frame with a path error (PERR) element to the source mesh network device over a second mesh link to a precursor mesh network device in the wireless mesh path. The PERR element identifies the link failure of the first mesh link. The multi-radio mesh control logic 202 encapsulates a copy of the PERR element into a payload of a second frame and transmits, via the secondary LR radio 206, the second frame to the source mesh network device.

In one embodiment, the first frame is a Hybrid Wireless Mesh Protocol (HWMP) Mesh Path Selection frame. The HWMP Mesh Path Selection frame can include a destination address field for the destination mesh network device, a sequence number (SN) field with a value corresponding to the destination mesh network device, a reason code field, and a flags field. The multi-radio mesh control logic 202 can set a subfield of the flags field to a first value indicative of the PERR element being sent by both the WLAN radio 204 and the secondary LR radio 206. The multi-radio mesh control logic 202 can set the reason code field to a second value indicative of a reason for the link failure. The second frame can be secondary long-range radio's transmission protocol frame. For example, the secondary long-range radio's transmission protocol frame can include a preamble and a payload. The payload can include a flags field having a first value indicative of the PERR element being sent by both the WLAN radio and the LPWAN radio and a reason code field having a second value indicative of a reason for the link failure.

Figure 3A:
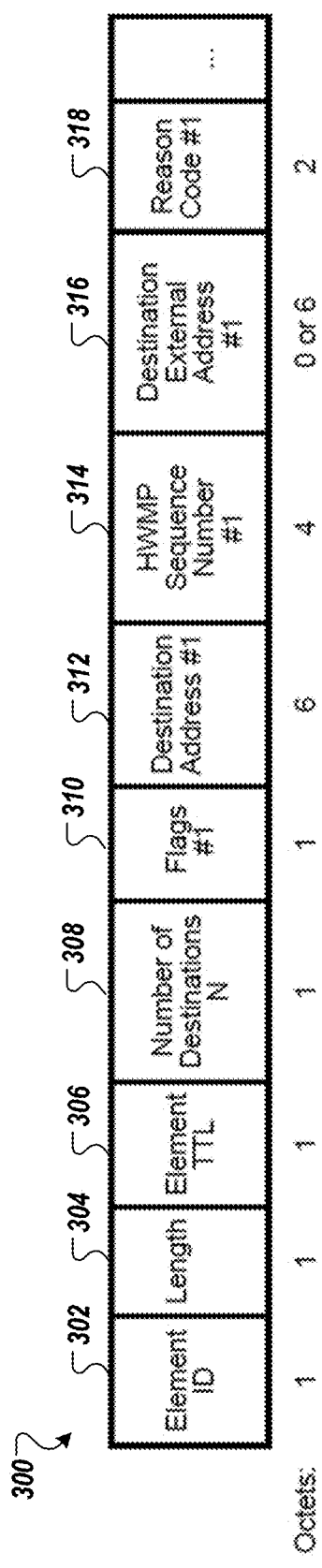
FIG. 3A illustrates a path error element used for announcing an unreachable destination node according to one embodiment.

FIG. 3A illustrates a path error element 300 used for announcing an unreachable destination node according to one embodiment. The path error element 300 (also referred to as PERR element 300) can be a HWMP Mesh Path Selection frame. The PERR element 300 includes an Element identifier (ID) field 302, a length field 304, an Element time-to-live (TTL) field 306, a Number of Destination N field 308, a flags field 310, a Destination Address field 312, a HWMP Sequence Number field 314, a Destination External Address field 316, and a reason code field 318. The Element TTL field 306 is coded as an unsigned integer and indicates the remaining number of hops allowed for this element. The Number of Destinations N field 308 is coded as an unsigned integer and indicates the number of announced destinations in PERR. The maximum value of N is 19. The Flags field 310, the Destination Address field 312, the HWMP Sequence Number field 314, the Destination External Address field 316, and the Reason Code field 318 can be repeated N times in the element. The HWMP Sequence Number field 314 is coded as an unsigned integer and indicates the HWMP SN for the invalidated destination, if applicable. Otherwise, the HWMP Sequence Number field 314 is reserved depending on the reason code specified in the Reason Code field 318. The Destination Address field 312 is represented as a 48-bit MAC address and indicates the detected unreachable destination MAC address. The Destination External Address field 316 is set to the external address, on behalf of which the PERR element is sent. This field is present only if Bit 6 (address extension (AE) subfield) in the Flags field 310 equals 1 and is represented as a 48-bit MAC address. The Reason Code field 318 specifies the reason for sending a PERR element 300. The Reason Code can be defined according to the protocol standard. The Reason Code field 318 can be used to indicate the reason that an unsolicited notification Management frame was generated. For example, the Reason Code field 318 can include the code 63 (e.g., MESH PATH ERROR DESTINATION UNREACHABLE) that indicates that the mesh STA determines that the link to the next hop of an active path in its forwarding information is no longer usable. The Reason Code field 318 can be contained in the PERR element 300 to indicate the reason for the path error. The length of the Reason Code field can be 2 octets. The PERR element 300 can be multiple octets as illustrated in FIG. 3A. The Reason Code field 318, such as the Reason Code Fields defined in section 9.4.1.7 of the existing standard, can be extended to carry new Reason codes, such as the examples shown in Table 1 below.

TABLE 1

| | Reason Code Field | |
|---|---|---|
| Reason Code | Name | Meaning |
| . . . | . . . (other reasons codes in 9.4.1.7 Reason Code Field) | . . . |
| N (127) | MESH_PATH_ERROR_CHANNEL_CONGESTION | The Path Error send in response to wireless channel congestion |
| N + 1 (128) | MESH_PATH_ERROR_LOAD_BALANCING | The Path Error send for load balancing |
| N + 2 (129) | MESH_PATH_ERROR_POWER_LOSS | The Path Error send for imminent power loss. |
| N + 3 (130) | MESH_PATH_ERROR_ISOLATED_NODE | The Path Error send for isolated node |

Figure 3B:
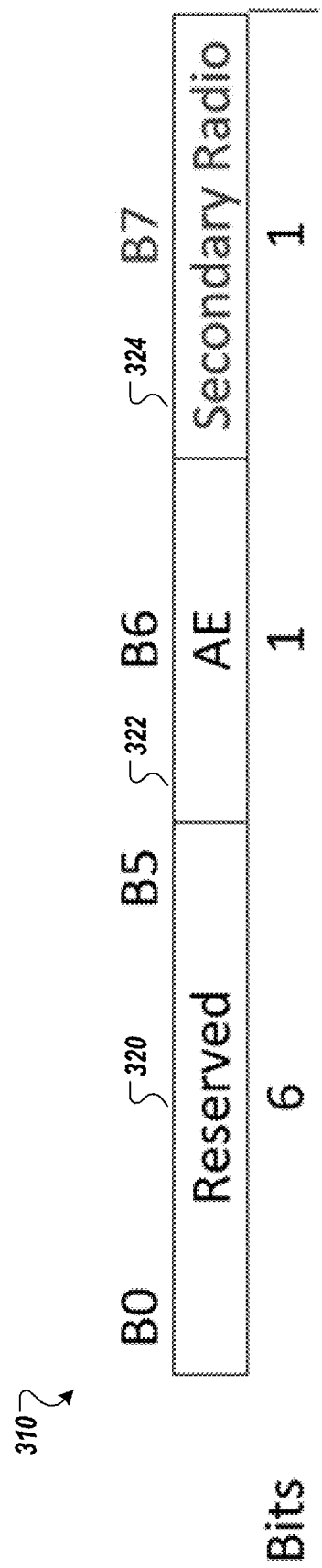
FIG. 3B illustrates a Flags field of the PERR element of FIG. 3A according to one embodiment.

FIG. 3B illustrates a Flags field 310 of the PERR element 300 of FIG. 3A according to one embodiment. The format of the Flags field 310 includes a first set of bits 320 (e.g., bits 0-5) that are reserved, an AE subfield 322 (e.g., bit 6) (1=destination external address is present, 0=otherwise), and a secondary radio subfield 324 (e.g., bit 7). The secondary radio subfield 324 being set to 1 in the PERR element 300 indicates that the PERR element was sent on both primary and secondary radios. The secondary radio subfield 324 being set to 0 in the PERR element indicates that the PERR element 300 is only sent on the secondary radio. The secondary radio subfield 324 can be a reserved field, such as Bit 7 of the flags field in the IEEE 802.11-2016 Standard.

Referring back to FIG. 3A, the PERR element 300 can be a HWMP element that can be processed by HWMP modes of operation according to common processing rules and primitives. Path selection in HWMP can use a sequence number mechanisms to enable mesh STAs to distinguish current path information from stale path information to maintain loop-free connectivity. Each mesh STA maintains its own HWMP SN, which is propagated to other mesh STAs in the HWMP elements. A path originator is the mesh STA that triggers the path discovery. The path originator can also be considered the source node or the source mesh network device in the wireless path. The path originator has a path originator address (e.g., MAC address). The path target is the entity to which the path originator attempts to establish a path. The path target can also be considered the destination node or the destination mesh network device in the wireless path. The path target has a path target address. An intermediate mesh STA is the mesh STA that participates in the path selection and is neither path originator nor path target. The intermediate mesh STA can also be considered an intermediate node or an intermediate mesh network device of the wireless path. It should be noted that a wireless path can include a forward path and a reverse path. The forward path is the mesh path to the path target, set up at the path originator and intermediate mesh STAs. The reverse path is the mesh path to the path originator, set up at the path target and intermediate mesh STAs. The forwarding information maintained by an originator mesh STA, an intermediate mesh STA, or a target mesh STA that allows the mesh STA to perform its path selection and forwarding functions. The terminology used when discussing forwarding information is relative to the mesh STA (reference mesh STA, given mesh STA or local mesh STA) and a particular mesh destination of the path. The following terms are specific to a given instance of the forwarding information: destination mesh STA—the end station (mesh STA) of a (forward or reverse) path; destination mesh STA address—the MAC address of the destination mesh STA; destination HWMP SN—the HWMP SN of the destination mesh STA; next-hop mesh STA—the next-hop mesh STA is the next peer mesh STA on the mesh path to the destination mesh STA; next-hop mesh STA address—the MAC address of the next-hop mesh STA; precursor mesh STA—the mesh STA is a neighbor peer mesh STA on the mesh path that identifies a given mesh STA as the next-hop mesh STA to the destination mesh STA; precursor mesh STA address—the MAC address of the precursor mesh STA; lifetime—the time during which forwarding information remains active; unreachable destination—the destination mesh STA is considered unreachable by a source mesh STA or an intermediate mesh STA if the link to the next hop of the mesh path to this destination mesh STA, as derived from its forwarding information, is no longer usable; element time to live (Element TTL)—An integer number that is used to limit the number of hops an HWMP element may be processed and propagated. Note that this Element TTL is different from the Mesh TTL in the Mesh Control field; and root mesh STA—the mesh STA that is the root of a path selection tree.

The PERR element 300 can be used for announcing an unreachable destination node according to one embodiment. The announcement is sent to all traffic sources that have a known active path to the destination(s). The active forwarding information associated with the unreachable destination(s) should no longer be used for forwarding. A PERR element may be either group addressed (if there are many precursors), individually addressed (if there is only one precursor), or individually addressed iteratively to all precursors. The PERR element is processed as a single element when iteratively individually addressed to several precursors. The PERR element contains the destinations that are unreachable. A PERR element is propagated by mesh STAs receiving a PERR element if certain conditions are met. A mesh STA generating or receiving a PERR element may attempt to establish paths to unreachable destinations using any of the available HWMP mechanisms. As described herein, in addition to sending the PERR element to a precursor mesh network device in the wireless path (e.g., via a mesh wireless link), a copy of the PERR element is sent via the secondary LR radio 206.

A mesh STA can send out a PERR element in an HWMP Mesh Path Selection frame for various conditions. For example, the mesh STA can send the PERR element when the mesh STA determines that the link to the next hop of an active path in its forwarding information is no longer usable. The detection might be triggered by the fact that a mesh STA is unable to forward an MAC Service Data Unit (MSDU) or MAC protocol Data Unit (MMPDU) to a next-hop mesh STA. The HWMP SN in the forwarding information of all unreachable destinations announced in this PERR element is incremented by 1. The forwarding information for each unreachable destination announced in this PERR element is invalidated. Alternatively, the mesh STA can send the PERR element when any of the following conditions apply: the mesh STA receives an individually addressed frame with a destination address not matching its own MAC address for which it has no forwarding information; the mesh STA receives an individually addressed frame with a destination address not matching its own MAC address and mesh forwarding is false (e.g., dot11MeshForwarding is false); the mesh STA is a proxy mesh gate and determines that an active proxy information where the mesh STA is the proxy mesh gate is no longer usable. Alternatively, the mesh STA can send the PERR element when all of the following conditions apply: the mesh STA received a PERR element from a neighbor peer mesh STA; a destination in the PERR element is the same as one of the destinations in the active forwarding information of the mesh STA where the next hop is the transmitter of the received PERR element, and the forwarding information or the proxy information has been invalidated; the mesh forwarding is true; and the Element TTL field in the received PERR element is greater than 1. The mesh STA can propagate the PERR element when received from another mesh STA. In addition, the mesh STA can transmit a copy of the PERR element via the LR radio 206 as described herein.

In one embodiment, the error condition is a link failure and the mesh STA can detect the link failure by tracking a number of frame retries to send a frame over the first wireless link to the next hop node. The next hop node can be a third mesh network device (e.g., destination node) or an intervening mesh network device on the wireless path to the third mesh network device. In the case that the first mesh network device is not adjacent to the third mesh network device (e.g., destination node), the first mesh network device can be considered an intermediate mesh network device. The mesh STA determines that the number of frame retries exceeds a threshold to detect the link failure.

In another embodiment, the error condition is a power loss condition and the mesh STA can detect the power loss condition by either receiving a power loss event over the first wireless link from the next hop node, or by itself (e.g., when the mesh STA itself is running on low battery). The power loss event indicates that the third mesh network device or an intervening mesh network device on the wireless path to the third mesh network device is about to lose power. The mesh STA can add a specified amount to a path metric for the first wireless link to obtain an updated path metric for the first wireless link and can report the updated path metric to the second mesh network device. The mesh STA can modify a metric for the first wireless link to obtain an updated metric for the wireless link. The updated metric can be used to prevent the first wireless link being selected in subsequent path selections by a source node. The path metric can be, include, or be derived from an airtime link metric. The airtime link metric defines an amount of channel resource consumed by transmitting a packet over a wireless link. The airtime link metric can be considered a dynamic link quality metric. Alternatively, the path metric can be, include, or be derived from other dynamic link quality metrics, expected transmission count (ETX), weighted cumulative expected transmission time (WCETT), expected transmission time (ETT).

In another embodiment, the error condition is a channel busy condition and the mesh STA can detect the channel busy condition by tracking a queue utilization metric of a data queue storing data to be communicated to the next hop node over the first wireless link. The queue utilization metric is an amount of data in the data queue that is addressed to the next hop node. The channel busy condition can identify a channel that is being utilized above the threshold level. The amount of utilization of a channel can be measured by airtime of communication on the channel. The airtime measurements for a particular channel can be compared against the threshold. When the airtime measurements exceed the threshold, the channel busy condition is detected. The next hop node is the third mesh network device or an intervening mesh network device on the wireless path to the third mesh network device. The mesh STA can determine that the queue utilization metric exceeds a threshold to detect the channel busy condition. As described herein, the mesh STA can add a specified amount to a path metric for the first wireless link to obtain an updated path metric for the first wireless link and report the updated path metric to the second mesh network device.

In another embodiment, the error condition is an isolated node condition and the mesh STA can detect the isolated node condition by receiving an isolated node event from the next hop node over the first wireless link. The isolated node event indicates that next hop node no longer has a wireless link to any other mesh network device in the wireless mesh network. The next hop node is the third mesh network device or an intervening mesh network device on the wireless path to the third mesh network device. The mesh STA can add a specified amount to a path metric for the first wireless link to obtain an updated path metric for the first wireless link and report the updated path metric to the second mesh network device.

In another embodiment, the error condition is an absent route condition and the mesh STA can detect the absent route condition by receiving a frame for a destination address for which there is no active route or an expired route. Some routes can be established with a lifetime (i.e. a period of time in which the route is active). When the lifetime of the route is expired, it is considered an expired route if the route is not renewed with an updated lifetime.

In one embodiment, not all mesh STAs in the wireless mesh can include the secondary LR radio. The mesh STA can detect the error condition of the first wireless link by receiving a third frame with a second path error message from a fourth mesh network device over a third wireless link between the first mesh network device and the fourth mesh network device. For example, the fourth mesh network device does not have the secondary LR radio to broadcast or unicast the PERR element on the secondary LR radio, but the mesh STA receives the PERR element from the fourth mesh network device. The fourth mesh network device can be the originator of the PERR element, but only sends the PERR element over the wireless mesh link, not on a secondary wireless link using a secondary LR radio. The first wireless link is between the fourth mesh network device and the next hop node. The next hop node is the third mesh network device or an intervening mesh network device on the wireless path to the third mesh network device. The second path error message identifies the error condition of the first wireless link. In a further embodiment, the mesh STA determines that a flags field in the third frame is set to a first value indicative of the second path error message being sent by the fourth mesh network device only over the third wireless link. In other embodiments, the mesh STA determines that the flags field is set to a second value indicative of the second path error message being sent by the fourth mesh network device over the third wireless link and transmitted by the secondary LR radio.

In another embodiment, a mesh node can send a path error for load balancing purpose when it is running out or resources e.g., CPU, memory, Input-output (IO, or other resources, as described herein.

Referring back to FIG. 2, the multi-radio mesh control logic 202 can interact with the secondary LR radio 206 upon detecting any of the following conditions for which a path error message is generated: 1) Upon detecting next hop unreachable based on the frame retries; 2) Upon detecting if this node is going to die (e.g., running out of battery, power)—the node in this case can add a configured cost (e.g., a specified amount) to the path metric to avoid being selected in future path discovery attempts by the source mesh network device; 3) Upon detecting local congestion (for load balancing purpose), queue utilization exceeds configured threshold, channel busy—the node in this case can add the configured cost to the path metric to avoid being selected in future path discovery attempts, until the congestion recovers, and the Path Error Reason Code can contain a custom value to indicate this condition; 4) Upon detecting if node is being isolated (no viable neighbors found)—the Path Error Reason code can contain a custom reason code to indicate this condition; 5) Upon detecting the next-hop idle (e.g., no receive, transmit detected from the peer next-hop within a configured time window)—the Path Error Reason code can contain a custom reason to indicate this condition; or 6) Upon receiving a frame for a destination for which there is no route. It should be noted that the mesh network device can report the updated path metric for a specified period of time or until the condition is no longer detected. For example, when the mesh network device no longer detects a power loss event, the mesh network device can stop adding the amount to the path metric, where the added amount operates as a penalty for the condition of the link. Alternatively, when a power loss event is detected, the mesh network device can report the path metric only for a period of time. In other embodiment, where a node has congestion, the mesh network device can detect that the queues are emptied and fall below a threshold amount. The mesh network device can then stop adding the amount to the path metric, removing the effective penalty caused by the busy condition.

As described herein, the multi-radio mesh control logic 202 of the mesh network device originating the path error message can, in addition to sending the path error message on the regular mesh link, encapsulate the path error message into the secondary long-range radio's transmission protocol frame. The secondary radio transmission could be unicast, or repeated broadcast (to increase reliability). As noted herein, the flags field can set a bit to indicate that the PERR element was sent on both primary and secondary radios.

While forwarding the path error message, the intermediate mesh nodes preserve the 'Secondary Radio' flag subfield. An intermediate node upon receiving the path error message on the mesh radio with 'Secondary Radio' set to 0 and no Path Error received on its secondary radio may, while propagating the Path Error back to source, also transmit it on its secondary radio. In this case, the 'Secondary Radio' bit is set to 1 before forwarding the modified Path Error message back to the source node on both mesh radio as well on the secondary radio. This can allow a mesh neighbor node to utilize its secondary radio for Path Error Propagation when the originator of the Path Error message may not have any secondary radio to transmit Path Error.

Figure 4A:
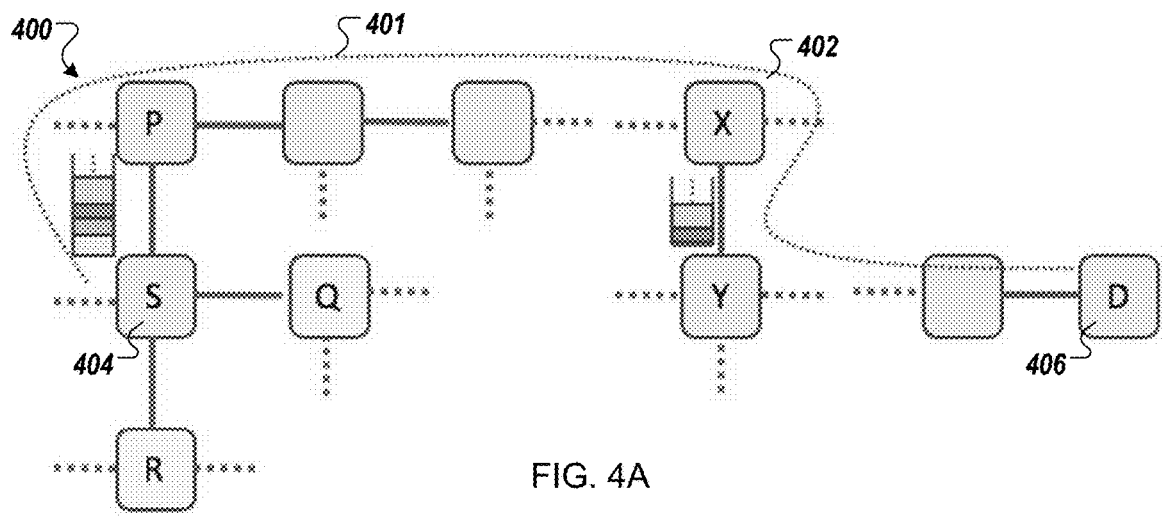
FIG. 4A-4C are diagrams illustrating an example where a mesh network device detects a link failure in a wireless mesh network and uses a secondary radio to transmit a copy of a path error message according to one embodiment.
Figure 4B:
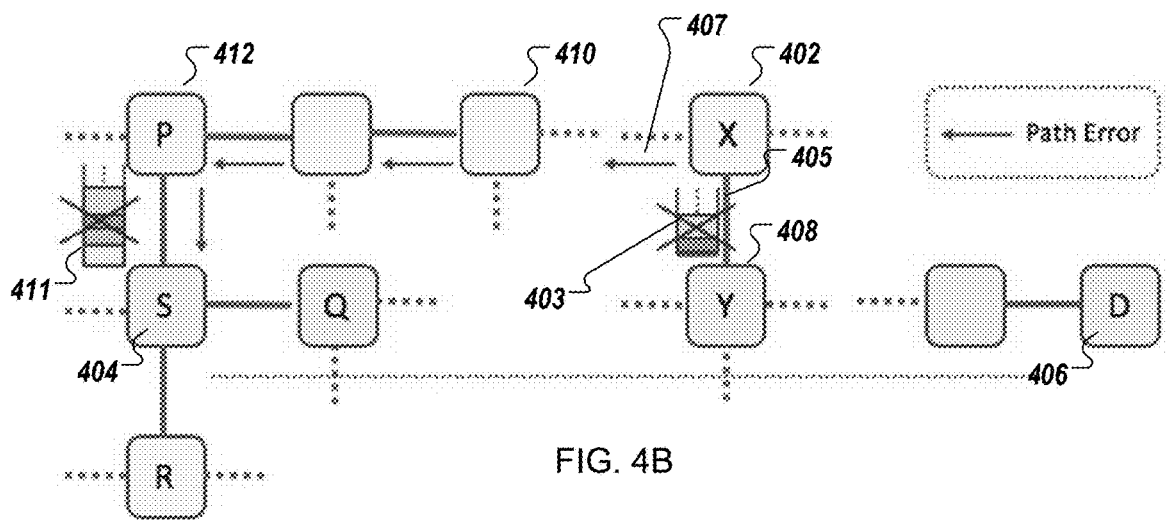
Figure 4C:
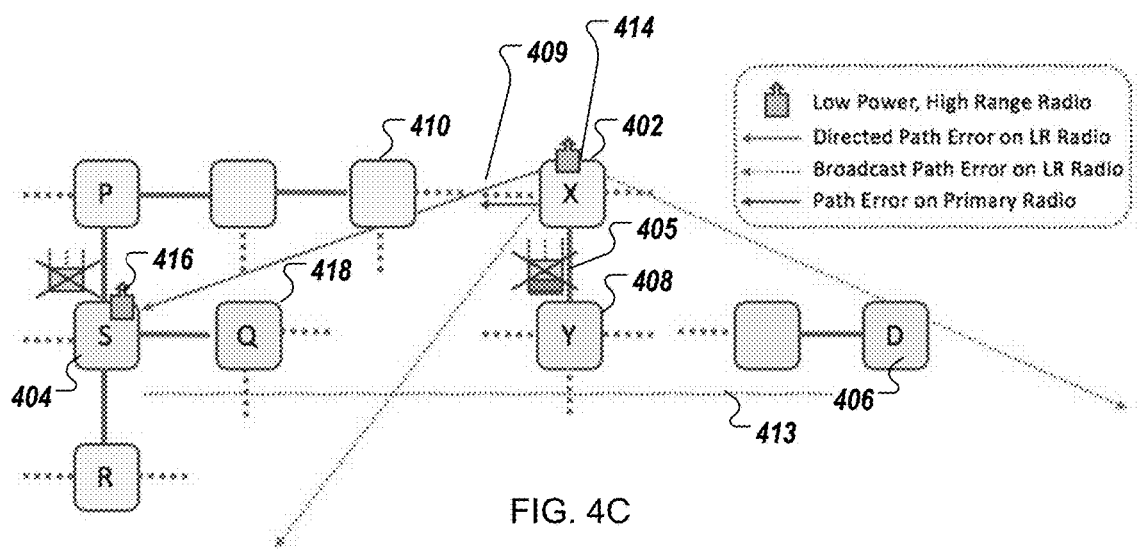

FIG. 4A-4C are diagrams illustrating an example where a mesh network device 402 detects a link failure 403 in a wireless mesh network 400 and uses a secondary radio to transmit a copy of a path error message according to one embodiment. As illustrated in FIG. 4A, the wireless mesh network 400 includes multiple mesh network devices and a wireless path 401 is established between a source mesh network device 404 and a destination mesh network device 406. The mesh network device 402 can be considered an intermediate mesh network device on the wireless path 401 between the source mesh network device 404 and the destination mesh network device 406. The number of intermediate mesh network devices on the wireless path 401 can vary and the wireless path 401 is just an example.

As illustrated in FIG. 4B, the mesh network device 402 can detect the link failure 403 (or other error condition) of a wireless link 405 between the mesh network device 402 and a next hop node 408. The next hop node 408 is a mesh network device that is next in the wireless path 401 in a first direction towards the destination mesh network device 406. The mesh network device 402, upon detecting the link failure 403 (or other error condition), generates a path error message 407 and sends the path error message 407 to a precursor node 410. The precursor node 410 is a mesh network device that is next in the wireless path 401 in a second direction towards the source mesh network device 404. The precursor node 410 forwards the path error message 407 to zero or more precursor nodes until it reaches the source mesh network device 404. It can be said that the path error message 407 is sent on the primary radio. In addition to sending the path error message 407 via the wireless path 401 in a reverse direction, the mesh network device 402 also sends the path error message via a secondary LR radio 414 (e.g., LoRa radio) as described below.

As illustrated in FIG. 4C, the mesh network device 402 also encapsulates a copy of the path error message 409 and sends the copy of the path error message 409 to the source mesh network device 404 using the secondary LR radio 414. The mesh network device 402 can send the copy of the path error message 409 using a broadcast frame (labeled "broadcast path error on LR radio"), a unicast frame directed to the source mesh network device 404 (labeled "directed path error on LR radio"), or a multicast frame directed to multiple mesh network devices, including the source mesh network device 404 (not illustrated in FIG. 4C).

In one embodiment, the mesh network device 402 receives a path error message from another mesh network device in the wireless path 401. The mesh network device 402, upon receiving the path error message can determine that the secondary radio subfield is set to a specified value that indicates that the other mesh network device did not send the path error message on a secondary LR radio 414. The mesh network device 402 can propagate the path error message 407 and send the copy of the path error message 409 as described above. The mesh network device 402 can also set the secondary radio subfield to a second value that indicates that the mesh network device 402 sent the path error message (e.g., 407, 409) on both the primary radio and the secondary LR radio 414.

As described above, route recovery is a very costly operation in the multi-hop mesh network upon detecting a link failure 403, especially if a network diameter is large. In particular, it takes time to propagate the path error message 407 from the mesh network device 402 to the source mesh network device 404 in the wireless path. Also, by the time the source mesh network device 404 receives the path error message 407 via the wireless path 401, the traffic queues build-up on all the intermediate nodes between the source mesh network device 404 and the mesh network device 402 experiencing the link failure 403. In general, the frames that were originated from the source mesh network device 404 and are currently sitting in the queues, such as illustrated in a queue 411 at mesh network device 412. These frames do not serve any purpose until the next hop drains the queue or the frames expire in the queue upon overflow. These frame can also create congestion on the wireless mesh network 400 where intermediate nodes buffer the frames but could not drain their queue due to link failure 403. In a worst case, these queues cannot serve any traffic for otherwise good routes, sharing the same set of nodes, due to queues overflow. The more time it takes for the path error message 407 to reach the source mesh network device 404, the more nodes start getting affected.

As illustrated in FIG. 4C, since the range of the secondary LR radio 414 covers the entire mesh network diameter, the source mesh network device 404 of the broken wireless path 401 detects the link failure 403 sooner than the path error message 407 is received via the wireless path 401. In some cases, the source mesh network device 404 can immediately detect the link failure (also referred to as a router failure) and can cease transmission on the existing wireless path 401 almost immediately. Source mesh network device can perform a path discovery process (also referred to as route discovery) and can steer traffic to the newly discovered path. Receiving a copy of the path error message 409 via the secondary LR radio 414, the source mesh network device 404 can expedite route error direction and route recovery. This route error detection can expedite route recovery and avoid intermediate nodes' queues from building up unnecessarily. In a further embodiment, all intermediate nodes in the wireless path 401, upon receiving the copy of the path error message 409 (or the path error message 407) can drop all the frames in their respective queues that are destined for the same destination mesh network device 406 for which the path error message indicated the link failure 403 (i.e., the broken route). This also allows the intermediate nodes to use the queues for other useful traffic almost immediately.

In another embodiment, when the path error message is generated in response to the local congestion, or node isolation, the path error message sent over the secondary LR radio 414 helps source discover another route balancing the network paths, being used to reach different destinations, across all the mesh nodes in the wireless mesh network 400. In some embodiments, the path error message 407 and/or the copy of the path error message 409 includes a reason code, such as in a Reason Code Field of the PERR element. The reason code allows the source mesh network device 404 to know the reason for the link failure 403 (or other error condition described herein).

As illustrated in FIG. 4A, the example topology, the source mesh network device 404 is communicating with the destination mesh network device 406. The wireless path 401, also referred to as a mesh route, goes through various intermediate mesh network devices (e.g., nodes P, X, and Y). In time, as illustrated in FIG. 4B, the mesh network device 402 detects the link failure 403 to the next hop node, node Y, and generates the path error message 407 to notify the source mesh network device 404 (source S). In this case, the path error message 407 is propagated by each intermediate node (including node P), before it reaches the source mesh network device 404. While this path error message 407 is back propagated to reach the source mesh network device 404, intermediate nodes still keep receiving traffic, originated by the source mesh network device 404 that is yet to learn the broken route, from the precursor nodes along the mesh route. Since the mesh network device 402 includes the secondary LR radio 414, the mesh network device 402 also transmits the path error message on both the mesh radio and the secondary R radio 414, as illustrated in FIG. 4C. Upon receiving this path error message on a secondary LR radio 416 at the source mesh network device 404, the source mesh network device 404 immediately learns the route failure, ceasing the current on-going traffic though node P and rediscovers a new wireless path 413 to the destination mesh network device 406 (node D) through mesh node 418 (node Q). The new wireless path 413 does not include the wireless link 405 experiencing the link failure 403. The amount of frame loss in this case is minimized as compared to relying on receiving the path error message 407 via the mesh links in the wireless path 401. Also, the intermediate nodes queues are not build-up due to inability of the mesh network device 402 (node X) to drain the traffic due to link failure 403 (link X-Y). All intermediate nodes upon receiving path error message can immediately drop the frames sitting in the respective queue.

In one embodiment, a mesh node, upon receiving the Path Error on a mesh path, propagates it back to the source node on a primary wireless path. It should be noted that the source node receives the Path Error almost immediately to invalidate the mesh path. When the source node receives the path error on the mesh path using the primary radio, the source node discards the Path Error given a sequence number in the Path Error for the destination node is the same as the one previously Path Error received on the secondary LR radio 414 and previously processed by the source node.

In some embodiments, such as when the network diameter is really large or when the secondary radio's range is not enough to cover an entire mesh diameter, the mesh network device can be configured to rebroadcast the received path error message. For example, when the secondary radio is a BLE radio, the BLE radio's range could possibly not cover the entire mesh diameter. The secondary radio on some or all mesh network device can be configured to rebroadcast the receive message, thereby making secondary radio for forwarding multi-hop. Rebroadcasting the path error message can still be quicker to reach the source mesh network device than the primary radio, such as when the source mesh network device is within one or more two maximum rebroadcasts to find out the broken path. An example of the source being within one rebroadcast is illustrated in FIG. 5.

Figure 5:
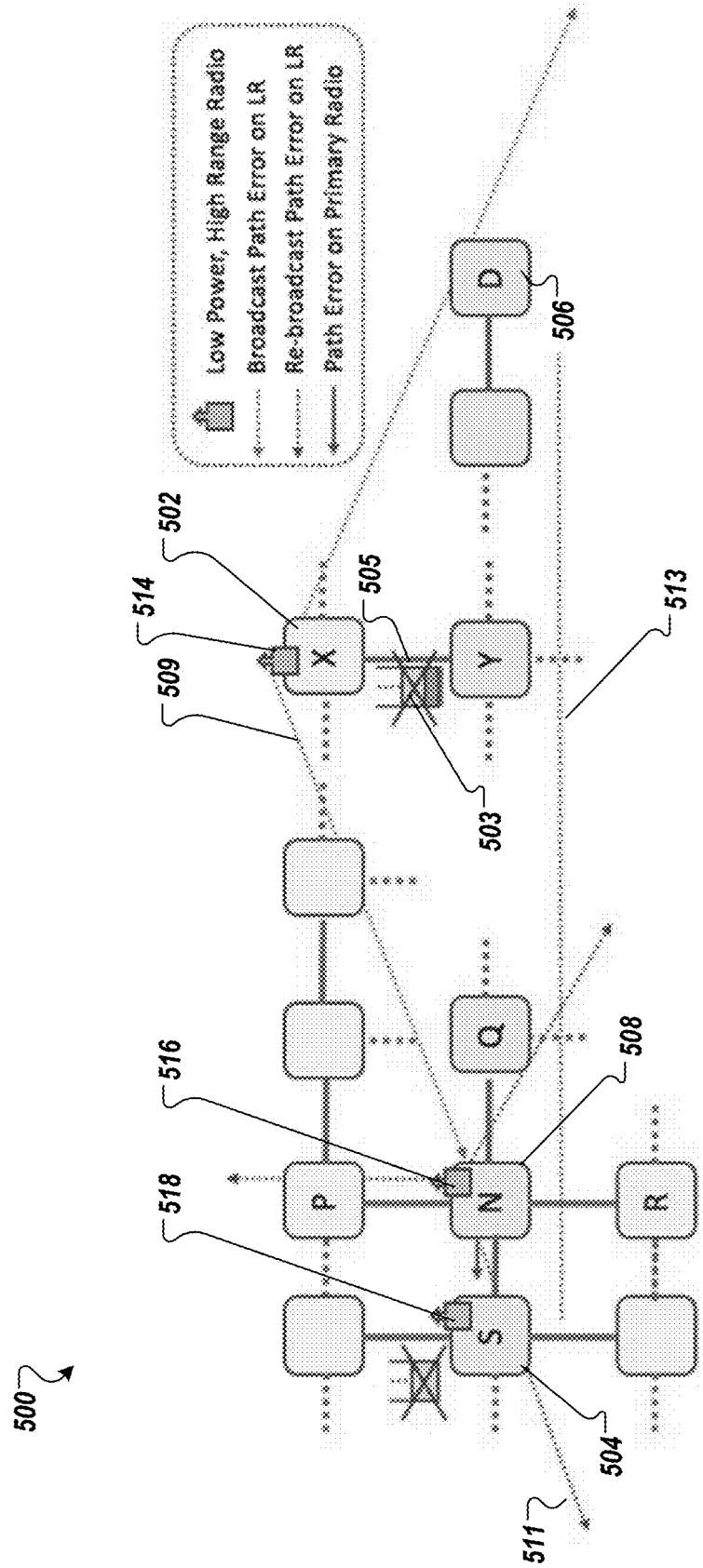
FIG. 5 is a diagram illustrating an example where a mesh network device detects a link failure in a wireless mesh network and uses a secondary radio to transmit a copy of a path error message and a second mesh network device rebroadcasts the copy of the path error message according to one embodiment.

FIG. 5 is a diagram illustrating an example where a mesh network device 502 detects a link failure 503 in a wireless mesh network 500 and uses a secondary radio 514 to transmit a copy of a path error message 509 and a second mesh network device 508 rebroadcasts the copy of the path error message according to one embodiment. The mesh network device 502 detects the link failure 503 on a mesh link 505 between the mesh network device 502 and a next hop node in a wireless path. The mesh network device 502 sends a path error message on a mesh link to a precursor node in the wireless path. In addition to sending the path error message via the wireless path in the reverse direction of the wireless path, the mesh network device 502 also sends the path error message 509 via a secondary radio 514 (e.g., secondary LR radio, a secondary BLE radio, or the like). As described herein, the mesh network device 502 can send the path error message 509 as a broadcast frame, a unicast frame, or a multicast frame. In this embodiment, because the source mesh network device 504 is outside a range of the secondary radio 514, the source mesh network device 504 may not receive the Path error message 509. The second mesh network device 508 (node N) receives the path error message 509 via a secondary radio 516 and can rebroadcast the path error message 509 to the source mesh network device 504 via the secondary radio 516. In one embodiment, the second mesh network device 508 sends the path error message 509 via a mesh link between the source mesh network device 504 and the second mesh network device 508. In another embodiment, the second mesh network device 508 sends the path error message 509 via the secondary radio 516 as a rebroadcasted path error message 511 and the source mesh network device 504 receives the rebroadcasted path error message 511 via a secondary radio 518 of the source mesh network device 504. The second mesh network device 508, upon receiving the path error message 509, can determine that the secondary radio subfield is set to a specified value that indicates that the mesh network device 502 sent the path error message 509 on both the primary radio and the secondary radio 514.

As illustrated in FIG. 5, since the range of the secondary radio 514 does not cover the entire mesh network diameter, the source mesh network device 504 of the broken wireless path can still detect the link failure 503 sooner than the path error message being received via the mesh links in the wireless path. The source mesh network device 504 can perform a path discovery process (also referred to as route discovery) and can steer traffic to a new wireless path 513. In some cases, the source mesh network device 504 can receive the path error message 509 via a combination of secondary radios and mesh paths. Although the example in FIG. 5 illustrates a scenario where the mesh network device 502 detects the link failure 503 and transmits the path error message 509 to the second mesh network device 508, which sends the path error message via the mesh link or rebroadcast via the secondary radio 516, in other embodiments, another intermediate mesh network device can receive a path error message from the mesh network device 502 that detects the link failure 503 and the other intermediate mesh network device can broadcast, unicast, or multicast the path error message 509 to the source mesh network device 504 or another mesh network device that rebroadcasts or sends the path error message 509 to the source mesh network device 504 in other various combinations of mesh communications via the primary radio(s) and wireless communications via the secondary radio(s), such as illustrated in FIG. 6.

Figure 6:
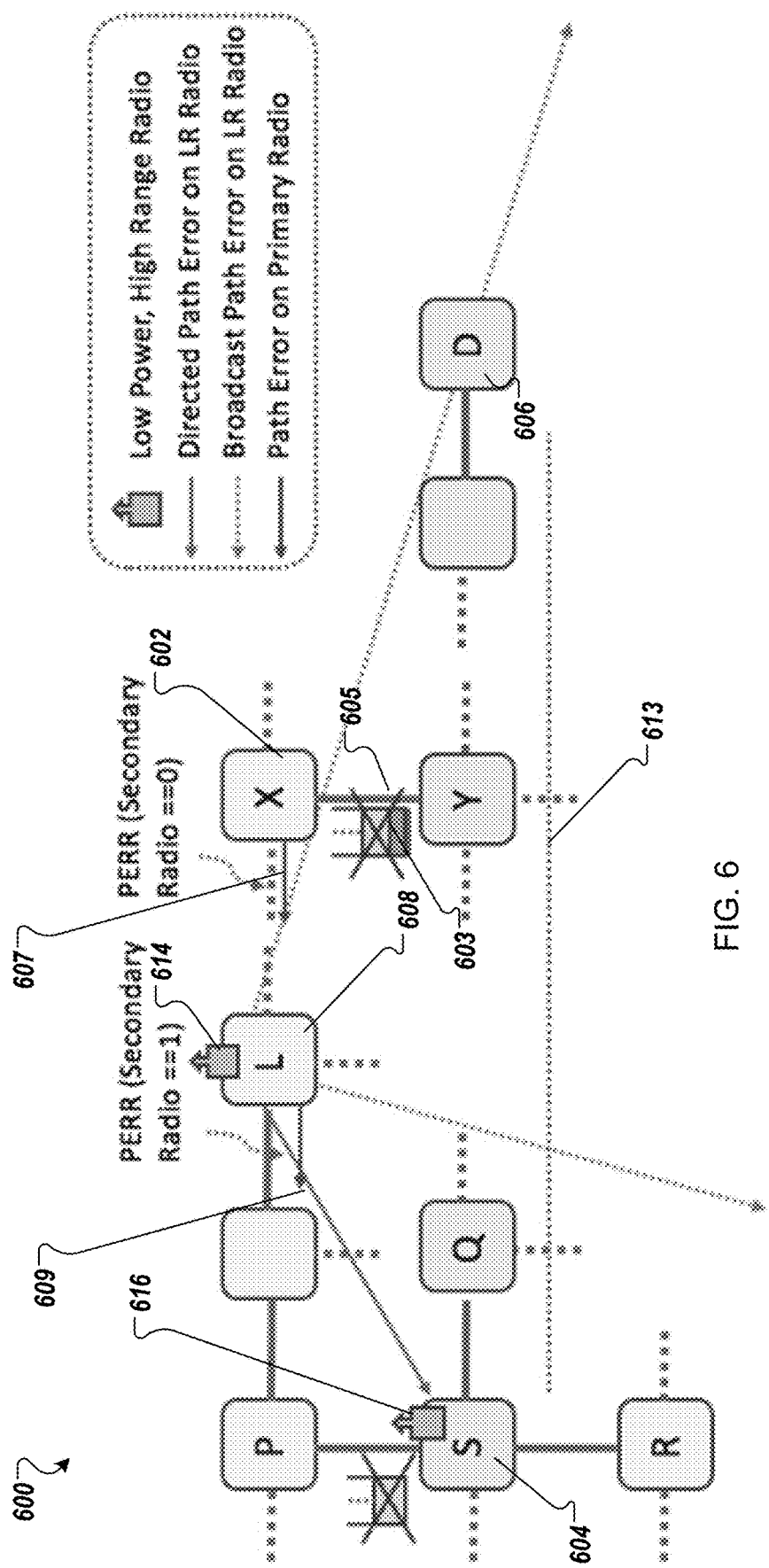
FIG. 6 is a diagram illustrating an example where a mesh network device detects a link failure in a wireless mesh network and a second mesh network device uses a secondary radio to transmit a copy of a path error message according to one embodiment.

FIG. 6 is a diagram illustrating an example where a mesh network device 602 detects a link failure 603 in a wireless mesh network 600 and a second mesh network device 608 uses a secondary radio 614 to transmit a copy of a path error message 609 according to one embodiment. The mesh network device 602 detects the link failure 603 on a mesh link 605 between the mesh network device 602 and a next hop node in a wireless path between a source mesh network device 604 and a destination mesh network device 606. The mesh network device 602 sends a path error message 607 on a mesh link to a precursor node in the wireless path. The precursor node is the second mesh network device 608 with a secondary radio 614. The mesh network device 602 may not include a secondary radio and sets the secondary radio field to zero in the path error message 607 (e.g., PERR element). The second mesh network device 608 receives the path error message 607 and determines that the link failure 603 has not been sent via a secondary radio. The second mesh network device 608 can send the path error message 607 along the mesh links back to the source mesh network device 604 in the reverse direction of the wireless path. The second mesh network device 608 can also transmit a copy of the path error message 609 via the secondary radio 614 (e.g., secondary LR radio, secondary BLE radio, or the like). As described herein, the second mesh network device 608 can send the path error message 609 as a broadcast frame, a unicast frame, or a multicast frame. In this embodiment, because the source mesh network device 604 is within a range of the secondary radio 614, the source mesh network device 604 receives the path error message 609 via a secondary radio 616. In another embodiment, such as when the source mesh network device 604 is not within the range, another mesh network device can receive the path error message 609 and rebroadcast or forward the path error message 609 to the source mesh network device 604 via the primary radio or the secondary radio 616.

The second mesh network device 608, upon receiving the path error message 507 can determine that the secondary radio subfield is set to a specified value that indicates that the mesh network device 602 sent the path error message 607 only on the primary radio (e.g., PERR secondary radio field is set to zero). The second mesh network device 608 can set the secondary radio subfield in the path error message 609 to a second specified value that indicates that the second mesh network device 608 sent the path error message on both the primary radio and the secondary radio 614.

As illustrated in FIG. 6, since the range of the secondary radio 514 covers the entire mesh network diameter, the source mesh network device 604 of the broken wireless path can detect the link failure 603 sooner than the path error message 507 being received via the mesh links in the wireless path. The source mesh network device 604 can perform a path discovery process (also referred to as route discovery) and can steer traffic to a new wireless path 613. In some cases, the source mesh network device 604 can receive the path error message 609 via a combination of secondary radios and mesh paths. Although the example in FIG. 6 illustrates a scenario where the mesh network device 602 detects the link failure 603 and sends the path error message via one or more mesh links and one or more of the intermediate mesh network devices transmit the path error message to the source mesh network device 604 or one or more other intermediate mesh network devices via the secondary radios.

Although various embodiments described herein are directed to detecting and sending a link failure via a secondary radio that covers a larger distance than a primary radio, in other embodiments, the secondary radio can be used for other purposes like sending critical alarms, interference detection events, or the like. The path error message being sent on both the primary and secondary radios can allows this scheme to work with both new nodes having secondary radios and nodes that do not have secondary radios.

Figure 7:
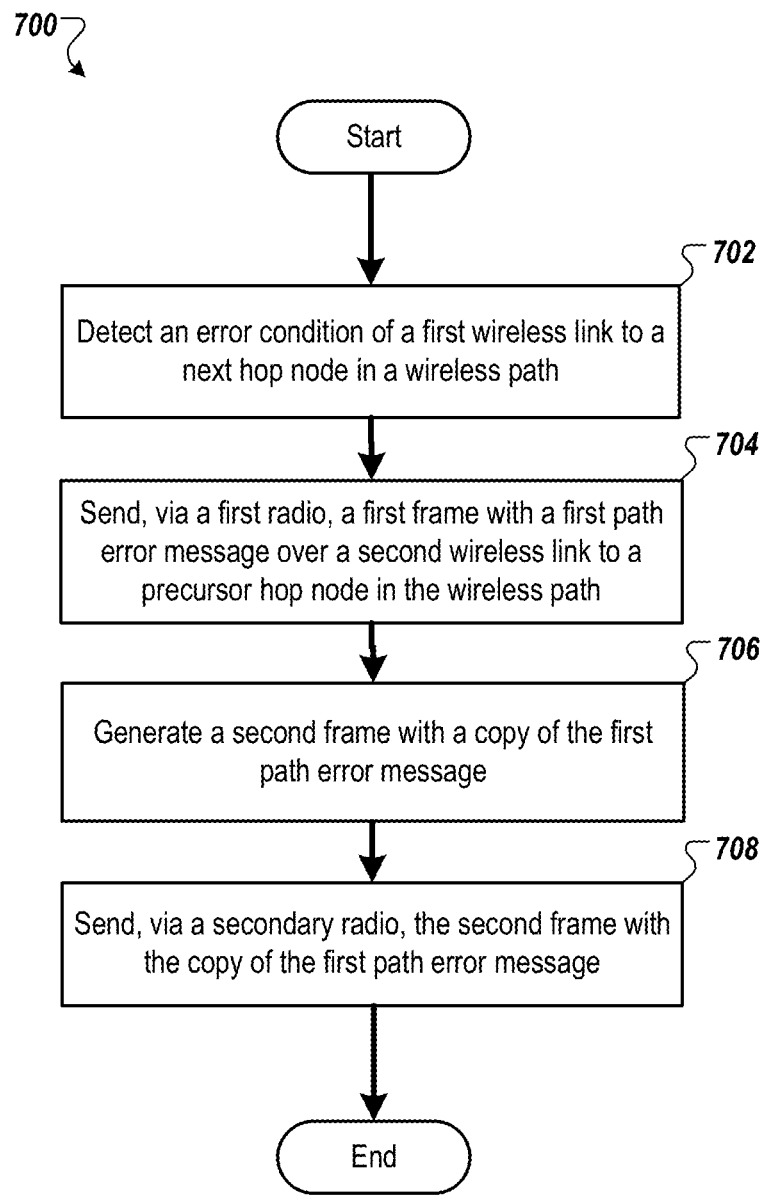
FIG. 7 a flow diagram of a method of transmitting a copy of a path error message via a secondary radio of a mesh network device according to one embodiment.

FIG. 7 a flow diagram of a method 700 of transmitting a copy of a path error message via a secondary radio of a mesh network device according to one embodiment. The method 700 may be performed by processing logic that comprises hardware (e.g., circuitry, dedicated logic, programmable logic, microcode, etc.), software, firmware, or a combination thereof. In one embodiment, the intermediate mesh network device 102 of FIG. 1, the multi-radio mesh network device 200 of FIG. 2, the mesh network device 402 of FIG. 4, the mesh network device 502 of FIG. 5, or the mesh network device 602 of FIG. 6 performs the method 700. Alternatively, an application processor of any of the mesh network devices of FIGS. 1-6 can perform the method 700. Alternatively, a processing device of an electronic device can perform the method 700.

Referring to FIG. 7, the method 700 begins by the processing logic of a first mesh network device detecting an error condition of a first wireless link to a next hop node in a wireless path between a second mesh network device (a source node) and a third mesh network device (a destination node) (block 702). The processing logic sends, via a first radio, a first frame (e.g., first data) with a first path error message over a second wireless link to a precursor hop node in the wireless path (block 704). The first path error message identifies the error condition of the first wireless link. The first wireless link and the second wireless link are part of the wireless path between the second mesh network device and the third mesh network device. The processing logic generates a second frame with a copy of the first path error message (block 706). The processing logic sends, via a secondary radio of the first mesh network device, the second frame (e.g., second data) with the copy of the first path error message (block 708), and the method 700 ends.

In a further embodiment, the second frame is a unicast frame. The unicast frame identifies the second mesh network device. The processing logic sends, via the secondary radio, the unicast frame to the second mesh network device. In another embodiment, the second frame is a broadcast frame. The broadcast frame does not identify a particular mesh network device. The processing logic sends, via the secondary radio, the broadcast frame to all mesh network devices in the wireless mesh network. In another embodiment, the second frame is a multicast frame that identifies a subset of mesh network device in the wireless mesh network. The processing logic sends, via the secondary radio, the multicast frame to the subset of mesh network devices in the wireless mesh network.

In a further embodiment, the error condition is a link failure. The processing logic detect the link failure at block 702 by tracking a number of frame retries to send a frame over the first wireless link to the next hop node. The next hop node is the third mesh network device (i.e., destination node) or an intervening mesh network device on the wireless path to the third mesh network device. The processing logic determines that the number of frame retries exceeds a threshold to detect the link failure.

In another embodiment, the error condition is a power loss condition. The processing logic can detect the power loss condition by receiving a power loss event over the first wireless link from the next hop node. The power loss event indicates that the third mesh network device (destination node) or an intervening mesh network device on the wireless path to the third mesh network device is about to lose power. Alternatively, the power loss event can indicate that the power is less than a specified threshold. The processing logic can add a specified amount to a path metric for the first wireless link to obtain an updated path metric for the first wireless link. The processing logic reports the updated path metric to the second mesh network device. Alternatively, the processing logic can detect the power loss condition using other techniques.

In another embodiment, the error condition is a channel busy condition. The processing logic can detect the channel busy condition by tracking a queue utilization metric of a data queue storing data to be communicated to the next hop node over the first wireless link. The next hop node is the third mesh network device (destination node) or an intervening mesh network device on the wireless path to the third mesh network device. The processing logic determines that the queue utilization metric exceeds a threshold to detect the channel busy condition. Alternatively, the processing logic can detect the channel busy condition using other techniques. In a further embodiment, the processing logic adds a specified amount to a path metric for the first wireless link to obtain an updated path metric for the first wireless link and reports the updated path metric to the second mesh network device.

In another embodiment, the error condition is an isolated node condition. The processing logic can detect the isolated node condition by receiving an isolated node event from the next hop node over the first wireless link. The isolated node event indicates that next hop node no longer has a wireless link to any other mesh network device in the wireless mesh network. The next hop node is the third mesh network device (destination node) or an intervening mesh network device on the wireless path to the third mesh network device. In another embodiment, the processing logic can detect that it has become isolated and can report the isolated node condition to any other mesh network device. The processing logic can add a specified amount to a path metric for the first wireless link to obtain an updated path metric for the first wireless link and report the updated path metric to the second mesh network device.

In another embodiment, the error condition is an absent route condition. The processing logic can detect the absent route condition by receiving a frame for a destination node for which there is no route.

In another embodiment, the processing logic detects the error condition at block 702 by receiving a third frame with a second path error message from a fourth mesh network device over a third wireless link between the first mesh network device and the fourth mesh network device. The fourth mesh network device does not have a secondary radio (e.g., LoRa radio) to broadcast, unicast, or multicast the path error message. The fourth mesh network device can be the originator of the path error message or can be another intermediate mesh network device that receives the path error message from another mesh network device. The first wireless link is between the fourth mesh network device and the next hop node. The next hop node is the third mesh network device (destination node) or an intervening mesh network device on the wireless path to the third mesh network device. The second path error message identifies the error condition of the first wireless link. In a further embodiment, the processing logic determines that a flags field in the third frame is set to a first value indicative of the second path error message being sent by the fourth mesh network device only over the third wireless link.

In general, a wireless mesh network (WMN), containing multiple mesh network devices organized in a mesh topology, is described. The embodiments described herein can be used in connection with a mesh network that is used as a content delivery platform for content delivery or Internet services. In some cases, the content delivery platform can be deployed in environments with less Internet infrastructure or sufficient Internet infrastructure. One of the content delivery platforms can be based on wireless local area network (WLAN) technologies. WLAN connectivity operating in unlicensed spectrum offers a cost-effective and scalable solution for a wireless wide area network (WWAN) to be deployed over a large densely populated region. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to the MNCS device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multimedia content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. Alternatively, the embodiments described herein can be utilized for providing web services. The embodiments described herein are compatible with existing content delivery technologies, and may leverage architectural solutions, such as content delivery network (CDN) services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

Figure 8:
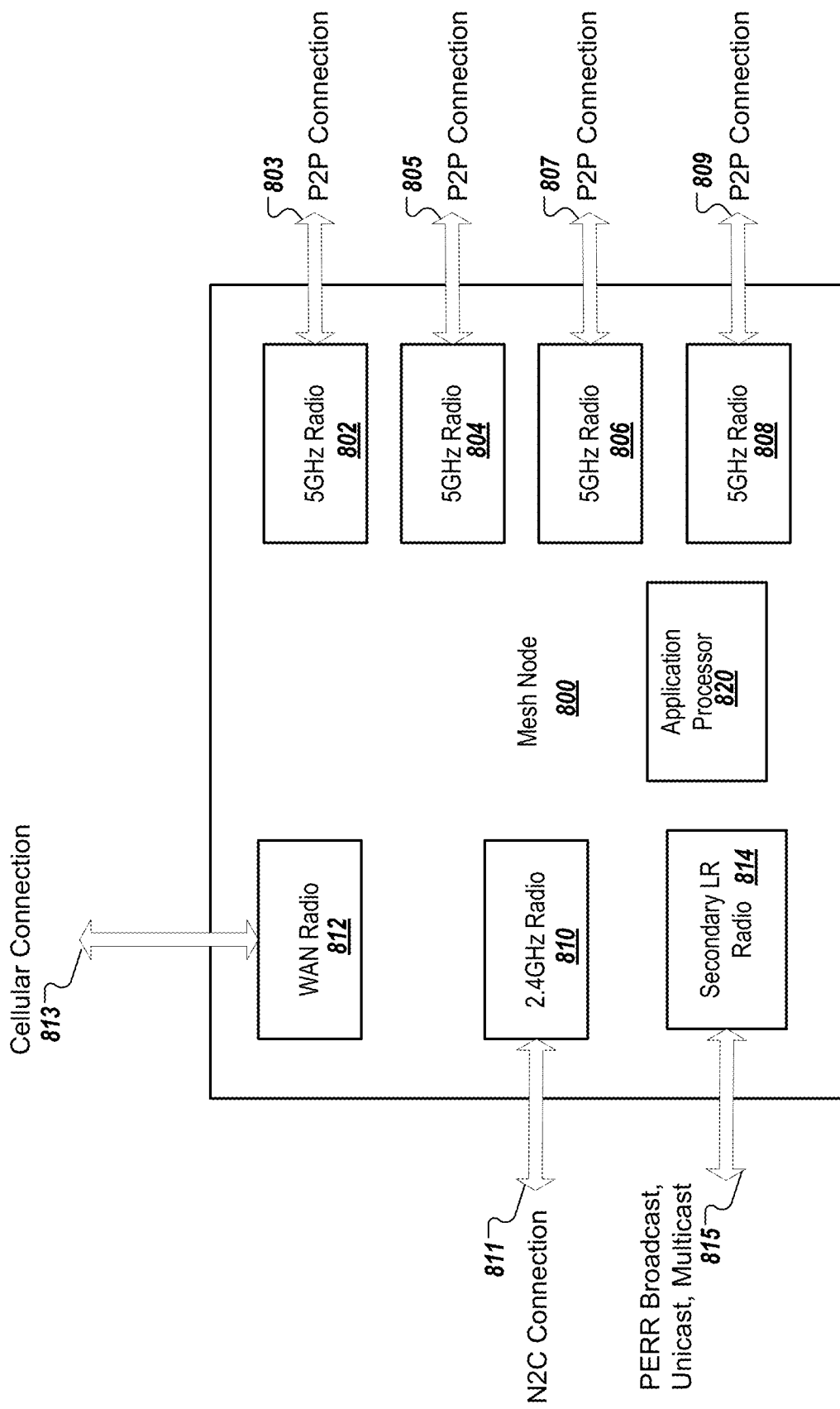
FIG. 8 is a block diagram of a mesh node with multiple radios, including a secondary LR radio, according to one embodiment.

FIG. 8 is a block diagram of a mesh node 800 with multiple radios, including a secondary LR radio 814, according to one embodiment. The mesh node 800 includes a first 5 GHz radio 802, a second 5 GHz radio 804, a third 5 GHz radio 806, a fourth 5 GHz radio 808, a 2.4 GHz radio 810, and a cellular radio 812. The first 5 GHz radio 802 creates a first P2P wireless connection 803 between the mesh node 800 and another mesh node (not illustrated) in a mesh network. The second 5 GHz radio 804 creates a second P2P wireless connection 805 between the mesh node 800 and another mesh node (not illustrated) in the mesh network. The third 5 GHz radio 806 creates a third P2P wireless connection 807 between the mesh node 800 and another mesh node (not illustrated) in the mesh network. The fourth 5 GHz radio 808 creates a fourth P2P wireless connection 809 between the mesh node 800 and another mesh node (not illustrated) in the mesh network. The 2.4 GHz radio 810 creates a N2C wireless connection 811 between the mesh node 800 and a client consumption device (not illustrated) in the mesh network. The N2C wireless connection may be one of a second set of one or more WLAN connections that operate at a second frequency of approximately 2.4 GHz. The cellular radio 812 creates a cellular connection between the mesh node 800 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In some embodiments, the mesh node 800 may be any one of the mesh network device described herein. In one embodiment, the mesh node 800 may be an ingress node or a mini-POP node that has attached storage and a network connection to access content outside of the mesh network. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

During operation, the mesh node 800 may receive a first request for a first content file from the first client consumption device over the first N2C connection 811. The mesh node 800 sends a second request for the first content file to a second network hardware device through the network backbone via a first set of zero or more intervening network hardware devices between the first network hardware device and the second network hardware device. The mesh node 800 receives the first content file through the network backbone via the first set of zero or more intervening network hardware devices and sends the first content file to the first client consumption device over the first N2C connection 811. In a further embodiment, the mesh node 800 includes the WAN radio 812 to wirelessly connect to a MNCS device by a cellular connection 813 to exchange control data.

In some embodiments, a path between the mesh node 800 and an ingress node (or any other mesh network device) could include zero or more hops of intervening network hardware devices. In some cases, the path may include up to 12-15 hops within a mesh network of N×N network hardware devices deployed in the mesh network.

In some embodiments, the mesh node 800 includes memory to store content files, control and command data, as well as the aggregate data described herein. The memory of the first network hardware device may be volatile memory, non-volatile memory, or a combination of both. When a content file is not stored in the memory or the storage of the mesh node 800, the mesh node 800 generates and sends a request to another node in the mesh network. Intervening network hardware devices can make similar determinations to locate the content file in the mesh network. In the event that the first content file is not stored in the mesh network, the content file can be requested from the mini-POP node. When the mini-POP node does not store the content file, the mini-POP can take action to obtain the first content file, such as requesting the first content file from a CDN over a point-to-point link. Alternatively, the human in the loop process can be initiated as described herein.

In a further embodiment, the P2P wireless connections 803, 805, 807, 809 are WLAN connections that operate in a first frequency range and the N2C connections 811 are WLAN connections that operate in a second frequency range. In another embodiment, the P2P wireless connections 803, 805, 807, 809 operate at a first frequency of approximately 5.0 GHz and the N2C connections 811 operate at a second frequency of approximately 2.4 GHz.

During operation, the mesh node 800 can detect an error condition, such as a link failure. The mesh node 800 can report a path error message (e.g., PERR element) via one of the first, second, third, and fourth 5 GHz radios 802, 804, 806, 808. The mesh node 800 can also send a copy of the path error message (e.g., a second frame with a copy of the PERR element) via the secondary LR radio 814. The secondary LR radio 814 can communicate the path error message as a wireless communication 815, such as a broadcast frame, a unicast frame, or a multicast frame.

The mesh node 800 can include an application processor 820 that is coupled to each of the radios. The application processor 820 can include the multi-radio mesh control logic 202 described above with respect to FIG. 2.

In another embodiment, a first mesh network device includes a first radio, a second radio that operates in a sub-gigahertz frequency range. For example, a sub-gigahertz radio operates in the ISM spectrum bands below 1 GHz, such as in the 769-935 MHz, 315 MHz, and the 468 MHz frequency range. The sub-gigahertz radio can be similar to radios used in the IoT applications. The first mesh network device also includes an application processor coupled to the first radio and the second radio. The application processor detects an error condition of a first wireless link in a wireless path between a second mesh network device and a third mesh network device. The application processor sends, via the first radio, first data over a second wireless link to a precursor hop node in the wireless path. The first data includes a first path error message that identifies the error condition of the first wireless link. The application processor sends, via the second radio, second data to the second mesh network device. The second data includes a copy of the first path error message in the first data.

In a further embodiment, the application processor, to detect the error condition of the first wireless link, receives third data including a second path error message from a next hop node in the wireless path. The second path error message includes information that the next hop node does not have a radio that operates in the sub-gigahertz frequency range. For example, the application processor can receive the second path error message via a third radio or the same first radio. The application processor can send the first data over the second wireless link by forwarding the second path error message as the first path error message. The application processor, to send the second frame with the copy of the first path error message, sends the second data as a unicast message to the second mesh network device, a broadcast message to all mesh network devices in the wireless mesh network, or a multicast message to some of the mesh network devices in the wireless mesh network.

In another embodiment, the error condition is a link failure and the application processor detects the error condition of the first wireless link by tracking a number of frame retries to send a frame over the first wireless link to a next hop node. The next hop node is the third mesh network device (destination node) or an intervening mesh network device on the wireless path to the third mesh network device (destination node). The application processor determines that the number of frame retries exceeds a threshold to detect the link failure.

In another embodiment, the error condition is a channel busy condition and the application processor detects the channel busy condition by tracking a queue utilization metric of a data queue storing data to be communicated to a next hop node over the first wireless link. The next hop node is the third mesh network device (destination node) or an intervening mesh network device on the wireless path to the third mesh network device. The application processor determines that the queue utilization metric exceeds a threshold to detect the channel busy condition.

In another embodiment, the application processor adds a specified amount to a path metric for the first wireless link to obtain an updated path metric for the first wireless link and reports the updated path metric to the second mesh network device.

Figure 9:
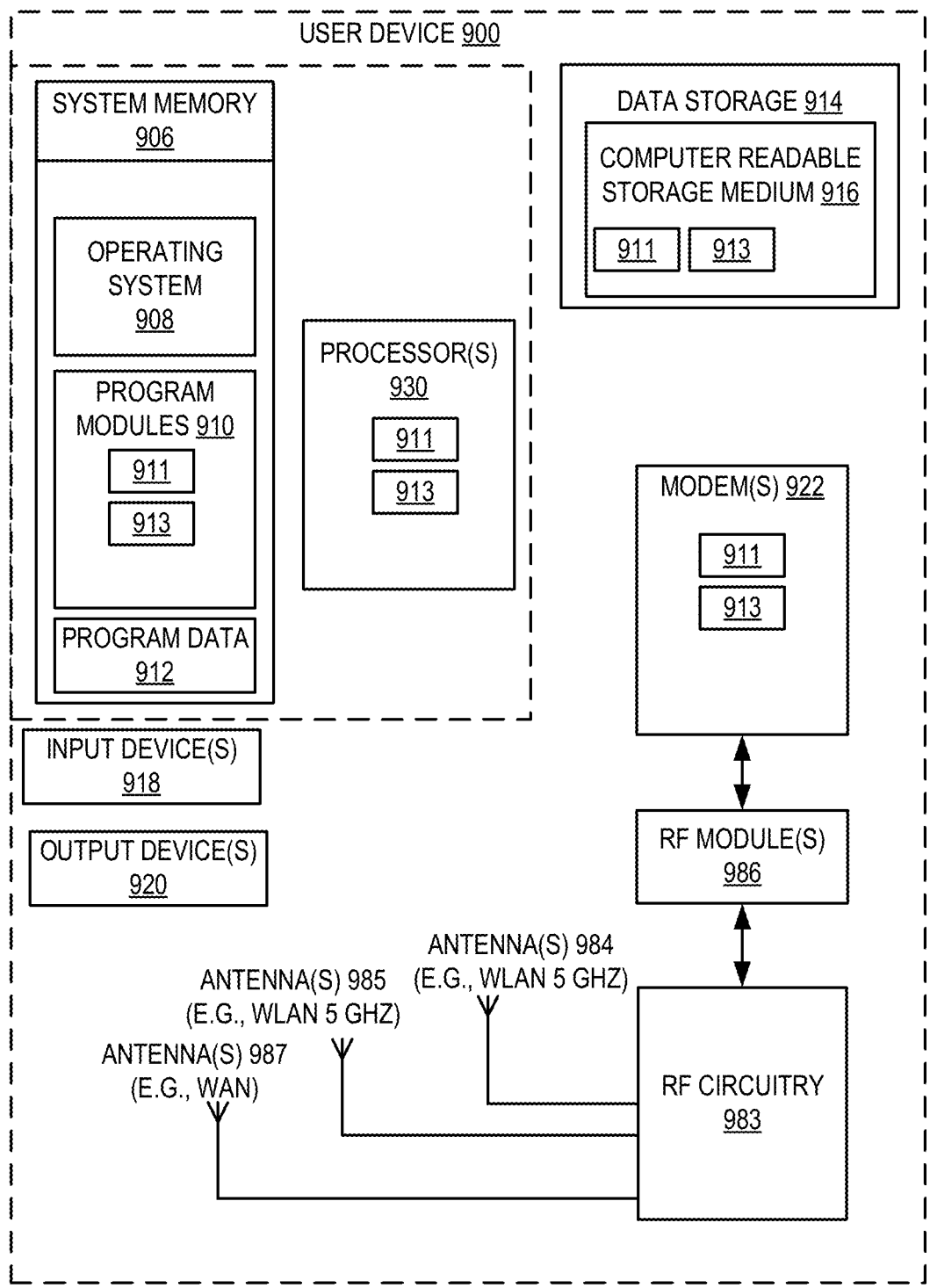
FIG. 9 is a block diagram of a network hardware device according to one embodiment.

FIG. 9 is a block diagram of a network hardware device 900 according to one embodiment. The network hardware device 900 may correspond to the mesh network devices described above with respect to FIGS. 1-8. Alternatively, the network hardware device 900 may be other electronic devices, as described herein.

The network hardware device 900 includes one or more processor(s) 930, such as one or more CPUs, microcontrollers, field programmable gate arrays, or other types of processors. The network hardware device 900 also includes system memory 906, which may correspond to any combination of volatile and/or non-volatile storage mechanisms. The system memory 906 stores information that provides operating system component 908, various program modules 910, program data 912, and/or other components. In one embodiment, the system memory 906 stores instructions of methods to control operation of the network hardware device 900. The network hardware device 900 performs functions by using the processor(s) 930 to execute instructions provided by the system memory 906. In one embodiment, the program modules 910 may include an error detection module 911 and a path recovery module 913. The error detection module 911 may perform some of the operations of the method 700 of FIG. 7. The path recovery module 913 may perform some additional operations to establish a new wireless path in the event of the path error message being received at a source mesh network device. Alternatively, the modules 911-913 may be implemented in a single module or multiple modules.

The network hardware device 900 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. Instructions for the program modules 910 (e.g., 911, 913) may reside, completely or at least partially, within the computer-readable storage medium 916, system memory 906 and/or within the processor(s) 930 during execution thereof by the network hardware device 900, the system memory 906 and the processor(s) 930 also constituting computer-readable media. The network hardware device 900 may also include one or more input devices 918 (keyboard, mouse device, specialized selection keys, etc.) and one or more output devices 920 (displays, printers, audio output mechanisms, etc.).

The network hardware device 900 further includes a modem 922 to allow the network hardware device 900 to communicate via a wireless connections (e.g., such as provided by the wireless communication system) with other computing devices, such as remote computers, an item providing system, and so forth. The modem 922 can be connected to one or more radio frequency (RF) modules 986. The RF modules 986 may be a WLAN module, a WAN module, PAN module, global positioning system (GPS) module, or the like. The antenna structures (antenna(s) 984, 985, 987) are coupled to the RF circuitry 983, which is coupled to the modem 922. The RF circuitry 983 may include radio front-end circuitry, antenna switching circuitry, impedance matching circuitry, or the like. The antennas 984 may be GPS antennas, near field communication (NFC) antennas, other WAN antennas, WLAN or PAN antennas, or the like. The modem 922 allows the network hardware device 900 to handle both voice and non-voice communications (such as communications for text messages, multimedia messages, media downloads, web browsing, etc.) with a wireless communication system. The modem 922 may provide network connectivity using any type of mobile network technology including, for example, cellular digital packet data (CDPD), general packet radio service (GPRS), EDGE, universal mobile telecommunications system (UMTS), 1 times radio transmission technology (1xRTT), evaluation data optimized (EVDO), high-speed down-link packet access (HSDPA), Wi-Fi®, Long Term Evolution (LTE) and LTE Advanced (sometimes generally referred to as 4G), etc.

The modem 922 may generate signals and send these signals to antenna(s) 984 of a first type (e.g., WLAN 5 GHz), antenna(s) 985 of a second type (e.g., WLAN 2.4 GHz), and/or antenna(s) 987 of a third type (e.g., WAN), via RF circuitry 983, and RF module(s) 986 as descried herein. Antennas 984, 985, 987 may be configured to transmit in different frequency bands and/or using different wireless communication protocols. The antennas 984, 985, 987 may be directional, omnidirectional, or non-directional antennas. In addition to sending data, antennas 984, 985, 987 may also receive data, which is sent to appropriate RF modules connected to the antennas. One of the antennas 984, 985, 987 may be any combination of the antenna structures described herein.

In one embodiment, the network hardware device 900 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 922 is shown to control transmission and reception via antenna (984, 985, 987), the network hardware device 900 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A mesh network device comprising: a wireless local area network (WLAN) radio;
    an event-driven radio that is enabled to transmit data only upon detection of an event; and an application processor coupled to the WLAN radio and the event-driven radio, wherein the application processor comprises multi-radio mesh control logic, wherein the multi-radio mesh control logic:
    detects a link failure of a first mesh link in a wireless mesh path between a source mesh network device and a destination mesh network device;
    enables the event-driven radio to transmit data responsive to detection of the link failure;
    sends, via the WLAN radio, a first frame with a path error (PERR) element to the source mesh network device over a second mesh link to a precursor mesh network device in the wireless mesh path, the PERR element identifying the link failure of the first mesh link;
    encapsulates a copy of the PERR element into a payload of a second frame; and
    sends, via the event-driven radio, the second frame to the source mesh network device.

2. The mesh network device of claim 1, wherein the first frame is a Hybrid Wireless Mesh Protocol (HWMP) Mesh Path Selection frame, wherein the HWMP Mesh Path Selection frame comprises a destination address field for the destination mesh network device, a sequence number (SN) field with a value corresponding to the destination mesh network device, a reason code field, and a flags field, and wherein the multi-radio mesh control logic further:
    sets a subfield of the flags field to a first value that indicates that the PERR element is being sent by both the WLAN radio and the event-driven radio; and
    sets the reason code field to a second value that identifies a reason for the link failure.

3. The mesh network device of claim 1, wherein the second frame comprises a preamble and the payload, wherein the payload comprises:
    a flags field comprising a first value indicates that the PERR element is being sent by both the WLAN radio and the event-driven radio; and a reason code field comprising a second value that identifies a reason for the link failure.

4. A method comprising:
    detecting, by a processor of a first mesh network device of a wireless mesh network, an error condition of a first wireless link in a wireless path between a second mesh network device and a third mesh network device, wherein the first wireless link is between the first mesh network device and a fourth mesh network device, wherein the fourth mesh network device is closer to the third mesh network device in the wireless path than the first mesh network device and the second mesh network device;
    sending, via a first radio of the first mesh network device, a first frame with a first path error message over a second wireless link between the first mesh network device and a fifth mesh network device in the wireless path, wherein the fifth mesh network device is closer to the second mesh network device in the wireless path than the first mesh network device and the fourth mesh network device, wherein the first path error message identifies the error condition of the first wireless link;
    generating, by the processor, a second frame with a copy of the first path error message; and
    sending, via a secondary radio of the first mesh network device, the second frame with the copy of the first path error message.

5. The method of claim 4, wherein the second frame is a unicast frame, the unicast frame identifying the second mesh network device, and wherein sending the second frame comprises sending, via the secondary radio, the unicast frame to the second mesh network device.

6. The method of claim 4, wherein the second frame is a broadcast frame, and wherein sending the second frame comprises sending, via the secondary radio, the broadcast frame to all mesh network devices in the wireless mesh network.

7. The method of claim 4, wherein the second frame is a multicast frame, and wherein sending the second frame comprises sending, via the secondary radio, the multicast frame to a subset of mesh network devices in the wireless mesh network.

8. The method of claim 4, wherein the error condition is a link failure, and wherein detecting the link failure comprises:
    tracking, by the first mesh network device, a number of frame retries to send a frame over the first wireless link to the fourth mesh network device; and
    determining, by the first mesh network device, that the number of frame retries exceeds a threshold.

9. The method of claim 4, wherein the error condition is a power loss condition, and wherein detecting the power loss condition comprises either receiving a first power loss event over the first wireless link from the fourth mesh network device or by detecting a second power loss event at the first mesh network device itself, wherein the first power loss event indicates that the fourth mesh network device is about to lose power, wherein the second power loss event indicates that the first mesh network device is about to lose power, and wherein the method further comprises:
    modifying a metric for the first wireless link to obtain an updated metric for the first wireless link, wherein the metric includes an airtime link metric; and
    reporting the updated metric to the second mesh network device.

10. The method of claim 4, wherein the error condition is a channel busy condition, and wherein detecting the channel busy condition comprises:
    tracking a queue utilization metric of a data queue, wherein the queue utilization metric is an amount of data in the data queue that is addressed to the fourth mesh network device;
    determining that the queue utilization metric exceeds a threshold;
    adding a specified amount to a path metric for the first wireless link to obtain an updated path metric for the first wireless link; and
    reporting the updated path metric to the second mesh network device.

11. The method of claim 4, wherein the error condition is a resource availability condition, and wherein detecting the resource availability condition comprises:
    tracking a metric that identifies an amount of available resources to process data by the first mesh network device;
    determining that the metric exceeds a threshold;
    adding a specified amount to a path metric for the first wireless link to obtain an updated path metric for the first wireless link; and
    reporting the updated path metric to the second mesh network device.

12. The method of claim 4, wherein the error condition is an isolated node condition, and wherein detecting the isolated node condition comprises receiving data that indicates that the fourth mesh network device no longer has a wireless link to any other mesh network device in the wireless mesh network, and wherein the method further comprises:
    modifying a metric for the first wireless link to obtain an updated metric for the first wireless link, wherein the metric includes an airtime link metric; and
    reporting the updated metric to the second mesh network device.

13. The method of claim 4, wherein the error condition is an absent route condition, and wherein detecting the absent route condition comprises receiving a frame for a destination address for which there is no active route or an expired route.

14. The method of claim 4, further comprising:
    receiving a third frame with a second path error message from a sixth mesh network device over a third wireless link between the first mesh network device and the sixth mesh network device, wherein the second path error message identifies an error condition of the third wireless link; and
    sending, via the secondary radio, a fourth frame with a copy of the second path error message.

15. The method of claim 14, further comprising determining that a flags field in the third frame is set to a first value, wherein the first value indicates that the second path error message was sent by the sixth mesh network device over the third wireless link.

16. A first mesh network device comprising:
    a first radio;
    a second radio that operates in a sub-gigahertz frequency range; and
    an application processor coupled to the first radio and the second radio, wherein the application processor is to:
        detect an error condition of a first wireless link in a wireless path between a second mesh network device and a third mesh network device, wherein the first wireless link is between the first mesh network device and a fourth mesh network device, wherein the fourth mesh network device is closer to the third mesh network device in the wireless path than the first mesh network device and the second mesh network device;

send, via the first radio, first data over a second wireless link between the first mesh network device and a fifth mesh network device in the wireless path, wherein the fifth mesh network device is closer to the second mesh network device in the wireless path than the first mesh network device and the fourth mesh network device, wherein the first data comprises a first path error message that identifies the error condition of the first wireless link; and send, via the second radio, second data to the second mesh network device, wherein the second data comprises a copy of the first path error message in the first data.

17. The first mesh network device of claim 16, wherein the application processor is further to:

receive third data comprising a second path error message from a sixth mesh network device over a third wireless link between the first mesh network device and the sixth mesh network device, wherein the second path error message comprises information that the sixth mesh network device does not have a radio that operates in the sub-gigahertz frequency range; and send, via the second radio, fourth data to the second mesh network device, wherein the fourth data comprises a copy of the second path error message in the third data.

18. The first mesh network device of claim 16, wherein the error condition is a link failure, wherein, to detect the error condition of the first wireless link, the application processor is to:

track a number of frame retries to send a frame over the first wireless link to the fourth mesh network device; and determine that the number of frame retries exceeds a threshold.

19. The first mesh network device of claim 16, wherein the error condition is a channel busy condition, and wherein, to detect the channel busy condition, the application processor is to:

track a queue utilization metric of a data queue, wherein the queue utilization metric is an amount of data in the data queue that is addressed to the fourth mesh network device; and determine that the queue utilization metric exceeds a threshold.

20. The first mesh network device of claim 16, wherein the application processor is further to:

modify a metric for the first wireless link to obtain an updated metric for the first wireless link, wherein the metric includes an airtime link metric; and report the updated metric to the second mesh network device.

\* \* \* \* \*